(12) United States Patent
Dufour et al.

(10) Patent No.: US 8,474,186 B2
(45) Date of Patent: Jul. 2, 2013

(54) DIRECT DRIVE SLIDER WINDOW ASSEMBLY

(75) Inventors: William T. Dufour, Macomb Township, MI (US); Robert J. Cicala, Rochester Hills, MI (US)

(73) Assignee: Dura Operating, LLC, Auburn Hills, MI (US)

( * ) Notice: Subject to any disclaimer, the term of this patent is extended or adjusted under 35 U.S.C. 154(b) by 555 days.

(21) Appl. No.: 12/052,976

(22) Filed: Mar. 21, 2008

(65) Prior Publication Data
US 2008/0229667 A1    Sep. 25, 2008

Related U.S. Application Data

(60) Provisional application No. 60/896,277, filed on Mar. 22, 2007.

(51) Int. Cl.
*E06B 1/00*    (2006.01)
(52) U.S. Cl.
USPC .................................. 49/380; 49/362; 49/413
(58) Field of Classification Search
USPC .............................. 49/380, 362, 116, 413, 118
See application file for complete search history.

(56) References Cited

U.S. PATENT DOCUMENTS

| | | | |
|---|---|---|---|
| 4,124,054 A | 11/1978 | Spretnjak | |
| 4,608,779 A * | 9/1986 | Maeda et al. | 49/374 |
| 4,920,698 A * | 5/1990 | Friese et al. | 49/380 |
| 4,995,195 A * | 2/1991 | Olberding et al. | 49/118 |
| 5,146,712 A * | 9/1992 | Hlavaty | 49/118 |
| 5,331,260 A * | 7/1994 | Ahmed | 318/282 |
| 5,442,880 A | 8/1995 | Gipson | |
| 5,522,191 A | 6/1996 | Wenner et al. | |
| 5,542,214 A | 8/1996 | Buening | |
| 5,613,323 A | 3/1997 | Buening | |
| 5,724,771 A | 3/1998 | Gipson | |
| 5,775,029 A | 7/1998 | Buening | |
| 5,787,643 A | 8/1998 | Schmuck | |
| 5,799,449 A | 9/1998 | Lyons et al. | |
| 5,822,922 A | 10/1998 | Grumm et al. | |
| 5,836,110 A | 11/1998 | Buening | |
| 5,941,022 A | 8/1999 | Schmuck | |
| 5,996,284 A * | 12/1999 | Freimark et al. | 49/209 |
| 6,014,840 A | 1/2000 | Ray et al. | |
| 6,018,913 A * | 2/2000 | Lin | 49/414 |
| 6,026,611 A | 2/2000 | Ralston et al. | |
| 6,038,819 A * | 3/2000 | Klein | 49/362 |
| 6,119,402 A * | 9/2000 | Wisner | 49/362 |
| 6,216,394 B1 * | 4/2001 | Fenelon | 49/349 |

(Continued)

*Primary Examiner* — Katherine Mitchell
*Assistant Examiner* — Catherine A Kelly
(74) *Attorney, Agent, or Firm* — Porter Wright; Richard M. Mascher; Dean B. Watson

(57) ABSTRACT

A slider window assembly for a motor vehicle includes a peripheral frame, at least one fixed panel located within the frame and adjacent an opening and a slider panel located within the frame and movable between a closed position wherein the slider panel covers the opening and an open position wherein the slider panel does not entirely close the opening. A drive assembly is operably connected to the slider panel to selectively move the slider panel between the closed and open positions. The drive assembly includes a rack secured to the slider panel, an electric motor secured to a fixed position on the slider window assembly, and a gear operably connected to the motor and operably engaging the rack so that operation of the motor in opposite directions moves the slider panel in opposite directions between the closed and open positions.

17 Claims, 8 Drawing Sheets

U.S. PATENT DOCUMENTS

| | | |
|---|---|---|
| 6,223,470 B1 | 5/2001 | Millard et al. |
| 6,324,788 B1 * | 12/2001 | Koneval et al. ................. 49/121 |
| 6,766,617 B2 | 7/2004 | Purcell |
| 6,810,622 B2 * | 11/2004 | Oberheide ..................... 49/362 |
| 7,437,852 B2 | 10/2008 | Dufour et al. |
| 7,509,773 B2 * | 3/2009 | Vornbaumen et al. .......... 49/362 |
| 7,568,312 B2 | 8/2009 | Dufour et al. |
| 7,765,738 B2 | 8/2010 | Dufour et al. |
| 2006/0080893 A1 * | 4/2006 | Lesle et al. ..................... 49/413 |
| 2008/0163553 A1 * | 7/2008 | Liao ............................... 49/362 |

* cited by examiner

DIRECT DRIVE SLIDER WINDOW ASSEMBLY

CROSS-REFERENCE TO RELATED APPLICATIONS

The application claims the priority benefit of U.S. Provisional Patent Application No. 60/896,277 filed on Mar. 22, 2007, the disclosure of which is expressly incorporated herein in its entirety by reference.

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to window assemblies for motor vehicles and, more particularly, to window assemblies for motor vehicles having a sliding window panel or "slider" movable into a closed and sealed position over an opening between static window panels.

BACKGROUND OF THE INVENTION

Many motor vehicles such as, for example, pickup trucks, cars, sport utility vehicles, cars, etc. have window assemblies with fixed glass panels. To improve circulation within the vehicles, these fixed window panels are sometimes provided with sliding window panels or "sliders" that move between an open position to provide a window opening between fixed window panels and a closed position to close the window opening. For example, passenger compartments of pickup trucks and other light trucks often have rearward facing window assemblies or "backlights" with sliding glass panels. Other vehicles have sliding windows on side windows or roof openings.

The sliding windows typically are manually operated between closed and open positions by a vehicle passenger pushing and/or pulling on the sliding window. The sliding panel can be flush with the fixed panels when in the closed position so that the sliding panel must first be moved out of the closed position into the interior of the vehicle and then slid in front of the fixed panel or the sliding panel can be parallel with the fixed panels but not flush so that the sliding panel can be merely slid in front of the fixed panel. In either case, the movement of the sliding panel is substantially parallel to the fixed panel.

Power driven sliding windows have also been provided wherein an electric motor is provided to selectively move the sliding window between its closed and open positions. The slider window is typically driven by a cable and drum assembly. The electric motor is secured to the vehicle structure and is suitably connected to cable and drum assembly.

Such window assemblies are typically provided to the motor vehicle manufacturer, or in the aftermarket, as slider window assemblies having both fixed and sliding panels ready for installation into the motor vehicle as a single unit. The assembly is simply secured in the vehicle opening. For the power driven windows, the motor must be secured to the vehicle sheet metal and connected to vehicle power. For aftermarket installations, this requires alteration of the vehicle sheet metal. It is noted that it is a never ending desire of the motor vehicle industry to reduce cost and/or weight as well as assembly ease and/or time. Accordingly, there is a need in the art for an improved slider window assembly.

SUMMARY OF THE INVENTION

The present invention addresses at least some of the above-noted problems of the related art. A slider window assembly for a motor vehicle is disclosed comprising, in combination a peripheral frame, at least one fixed panel located within the frame and adjacent an opening, a slider panel located within the frame and movable between a closed position wherein the slider panel covers the opening and an open position wherein the slider panel does not entirely close the opening. A drive assembly is operably connected to the slider panel to selectively move the slider panel between the closed and open positions. The drive assembly includes a rack secured to the slider panel, an electric motor secured to a fixed position on the slider window assembly, and a gear operably connected to the motor and operably engaging the rack so that operation of the motor in opposite directions moves the slider panel in opposite directions between the closed and open positions.

Also disclosed is a slider window assembly for a motor vehicle comprising, in combination, at least one fixed panel located adjacent an opening, and a slider panel movable between a closed position wherein the slider panel covers the opening and an open position wherein the slider panel does not entirely close the opening. A drive assembly is operably connected to the slider panel to selectively move the slider panel between the closed and open positions. The drive assembly includes an electric motor secured to the fixed panel.

Also disclosed is a slider window assembly for a motor vehicle comprising, in combination, at least one fixed panel adjacent an opening, and a slider panel movable between a closed position wherein the slider panel covers the opening and an open position wherein the slider panel does not entirely close the opening. A drive assembly is operably connected to the slider panel to selectively move the slider panel between the closed and open positions. The drive assembly includes a rack secured to the slider panel, an electric motor, a gear operably connected to the motor and operably engaging the rack so that operation of the motor in opposite directions moves the slider panel in opposite directions between the closed and open positions, and a manually-operable control switch secured to the slider window assembly and operably connected to the motor to selectively activate and deactivate the motor.

From the foregoing disclosure and the following more detailed description of various preferred embodiments it will be apparent to those skilled in the art that the present invention provides a significant advance in the technology and art of slider window assemblies. Particularly significant in this regard is the potential the invention affords for providing a high quality, feature-rich, relatively low cost, easy to install slider window assembly. Additional features and advantages of various preferred embodiments will be better understood in view of the detailed description provided below.

BRIEF DESCRIPTION OF THE DRAWINGS

These and further features of the present invention will be apparent with reference to the following description and drawing, wherein.

Figure 1:
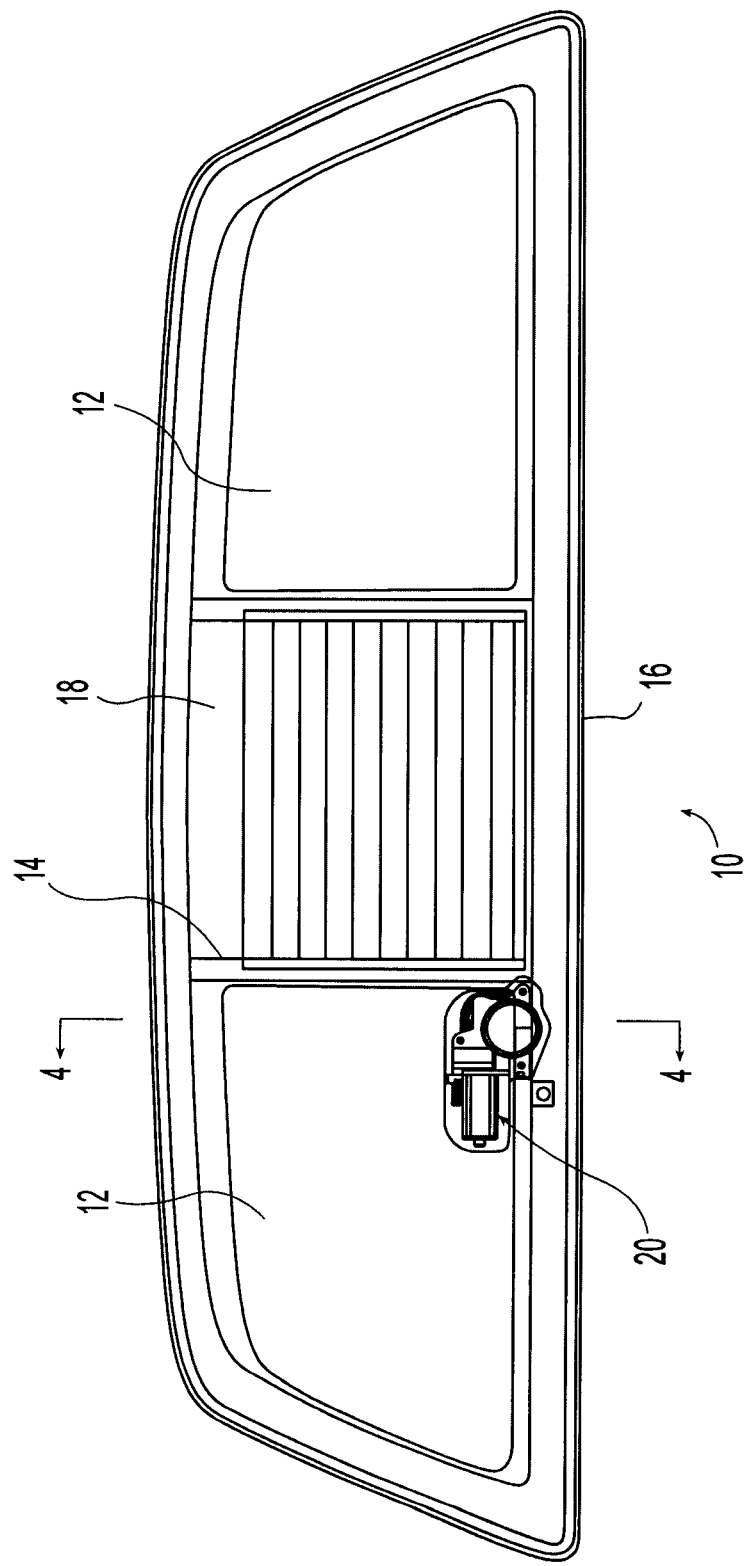
FIG. 1 is a front elevational view of a slider window assembly according to the present invention, wherein the sliding panel is in a fully closed position and components have been removed for clarity.
Figure 2:
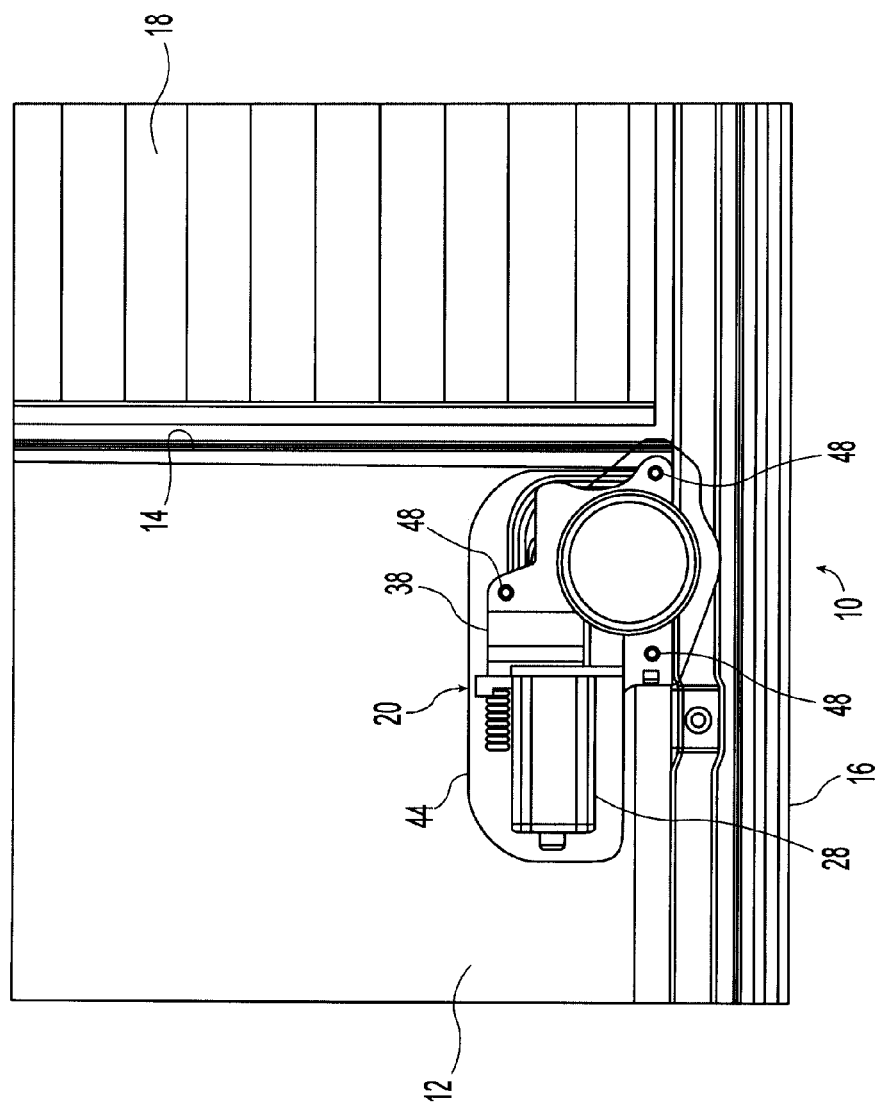
FIG. 2 is an enlarged, fragmented front elevational view showing a drive assembly of the slider window assembly of FIG. 1.
Figure 3:
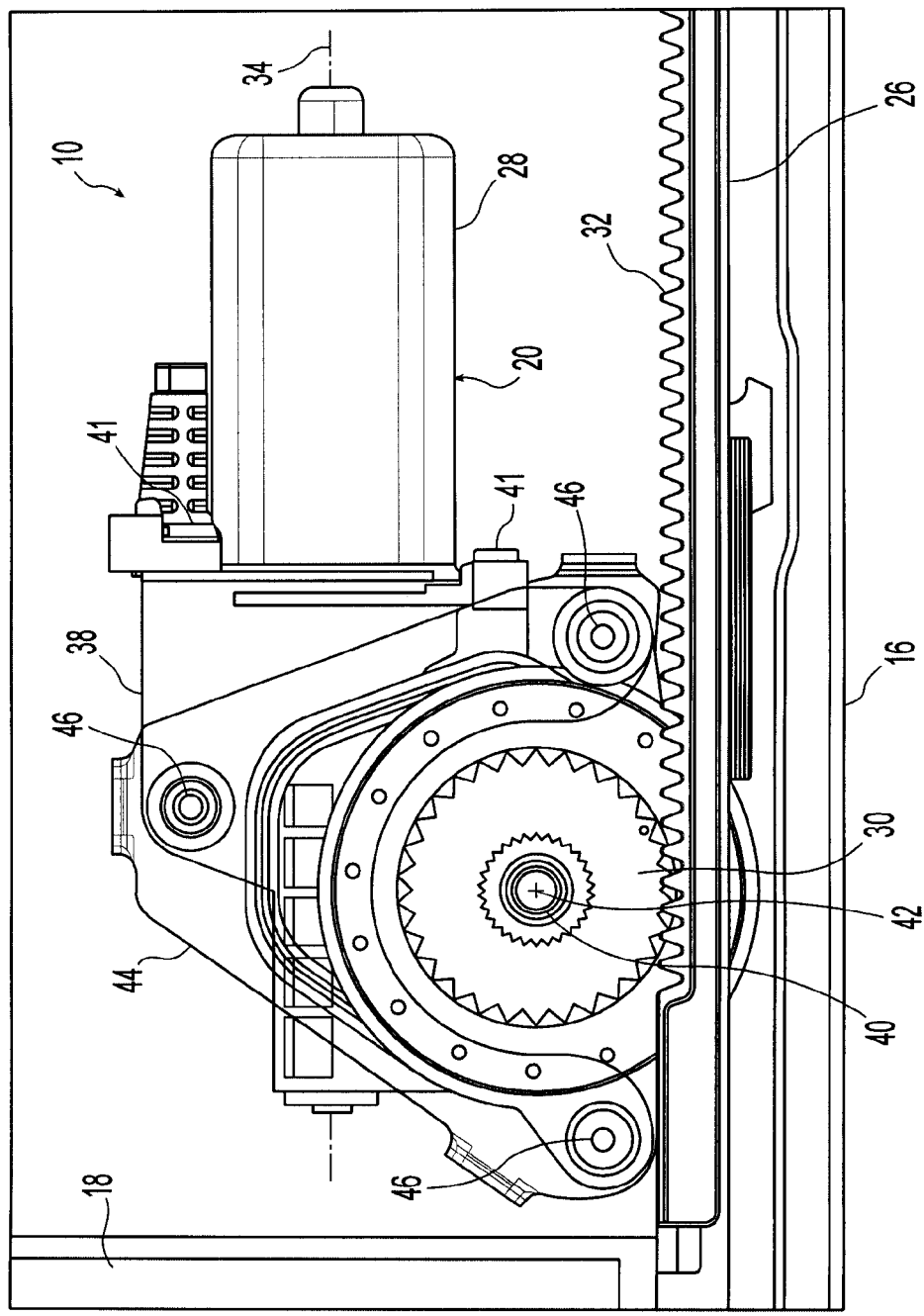
FIG. 3 is an enlarged, fragmented rear elevational view of the drive assembly of the slider window assembly of FIGS. 1 and 2, wherein additional components have been removed for clarity.
Figure 4:
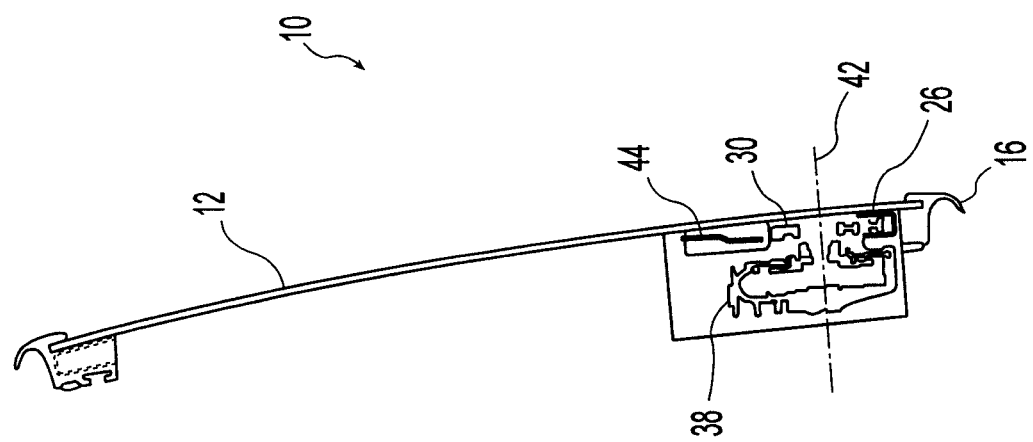
FIG. 4 is a cross-sectional view taken along line 4-4 of FIG. 1.

It should be understood that the appended drawings are not necessarily to scale, presenting a somewhat simplified representation of various preferred features illustrative of the basic principles of the invention. The specific design features of a slider window assembly as disclosed herein, including, for example, specific dimensions and shapes of the various components will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the slider window assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the motor vehicle and out of the plane of the paper in FIG. 1 and aft, rear, or rearward refers to a direction toward the rear of the motor vehicle and into the plane of the paper in FIG. 1. Also right refers to a direction toward the right or passenger side of the motor vehicle and in a left direction within the plane of the paper in FIG. 1 and left refers to a direction toward the left or driver side of the motor vehicle and in a right direction within the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved slider window assemblies disclosed herein. The following detailed discussion of various alternative and preferred embodiments will illustrate the general principles of the invention with reference to a slider window assembly for use as a backlight of a pickup or other light duty truck. Other embodiments suitable for other applications will be apparent to those skilled in the art given the benefit of this disclosure.

Referring now to the drawings, FIGS. 1 to 4 show a slider window assembly 10 for a motor vehicle according to the present invention. The illustrated slider window assembly 10 includes a pair of laterally spaced apart static or fixed panels 12 forming an opening 14 therebetween, a frame 16 at least partially encircling the fixed panels 12 and the opening 14, a slider panel 18 slideable along a generally horizontal axis between a fully closed position wherein the slider panel 18 covers the opening 14 to sealingly close the opening 14 and a fully open position wherein the center or slider panel 18 is moved away from the opening 14 so that the opening 14 is at least partially open and preferably substantially and/or entirely open to provide access and/or ventilation for the passenger compartment of the motor vehicle through the opening 14 in the window assembly 10, and an electrically-powered drive assembly 20 operably connected to the slider panel 18 to selectively move the slider panel 18 between its closed and open positions.

The illustrated fixed panels 12 are each a single pane or sheet that defines one side of the opening 14 with the frame 16 defining the top and bottom of the opening 14. Each panel 12 includes a first or exterior surface and an opposite second or interior surface that is generally parallel to the first surface. Both of the surfaces terminate at a peripheral edge that defines the geometric shape of the fixed panel 12. The illustrated fixed panels 12 are compound curved (curved in at least two directions) but it is noted that the fixed panes can alternatively be curved, bent, or generally planar to conform to the desired need or application. The illustrated fixed panels 12 cooperate to form a generally trapezoidal shape so that the window assembly 10 is generally trapezoidal shaped but it is noted that any other suitable shape can alternatively be utilized. The illustrated opening 14 is generally square or rectangular shaped but is noted that any other suitable shape and/or location can alternatively be utilized. It is noted that other quantities of fixed panels can alternatively be utilized such as, for example, a single fixed panel 12 can have the opening 14 cut or otherwise formed within the single fixed panel 12 so that the fixed panel forms all sides of the opening or three or more fixed panels 12 can at least partially form the opening.

The fixed panels 12 are preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the fixed panels 12. Usually, the frit layer is utilized to form a continuous strip on the interior surface near the peripheral edge of the fixed panel 12. When viewed from the exterior of the motor vehicle, the frit layer provides an appearance of depth and richness which blends with surrounding painted or glass surfaces of the motor vehicle and/or hides and conceals components mounted to the fixed panels 12 within the motor vehicle.

The illustrated fixed panels 12 are rigidly held stationary within the slider frame 16 which is rigidly fixed to the motor vehicle. It is noted that alternatively, the frame 16 can be eliminated so that the fixed panel 12 is directly secured to the motor vehicle to obtain a frameless appearance. As best shown in FIG. 10, the motor vehicle preferably includes one or more body panels 22 that define a window opening 24. The slider frame 16 or fixed panel 12 is positioned within the vehicle window opening 24 to close the opening 24 and is secured and sealed to the body panels 22 in any suitable manner.

The illustrated slider panel 18 is a single pane or sheet that is sized to entirely cover the opening 14 when the slider panel 18 is in its closed position. The slider panel 18 includes a first or exterior surface and an opposite second or interior surface that is generally parallel to the first surface. Both of the surfaces terminate at peripheral edges that define the geometric shape of the slider panel 18. The illustrated slider panel 18 is generally square shaped with rounded or radiused corners including a top edge, a bottom edge, a first or right side edge, and a second left side edge. It is noted that the slider panel 18 can alternatively have any other suitable shape. The slider panel 18 may be compound curved, curved, bent, or generally planar to conform to the desired need or application.

The slider panel 18 is preferably formed of transparent glass which may be tempered, laminated, or otherwise strengthened using conventional techniques and principles. Although glass is preferred, other suitable relatively rigid, sheet-like panel materials may alternatively be used such as, for example, plastic materials, multi-component laminates (for example, laminates of glass and plastic), or the like. Although a transparent material is preferred, other suitable materials may alternatively be used such as, for example, opaque, translucent, transparent coated materials, or the like. When desired, an opaque ceramic frit layer or coating may cover all or a portion of the slider panel 18. Usually, the frit layer is utilized to form a continuous strip on the interior surface near the peripheral edge. When viewed from the exterior of the motor vehicle, the frit layer provides an appearance of depth and richness which blends with surrounding painted or glass surfaces of the motor vehicle and/or hides and conceals components mounted to the slider panel 18 within the motor vehicle.

The drive assembly 20 includes a drive rack 26 rigidly secured to the slider panel 18 for movement therewith, an electric drive motor 28 secured to a fixed or stationary position on the slider window assembly 10, and a drive gear 30 operably connected to the drive motor 28 and operably engaging the drive rack 26 so that operation of the drive motor 28 in opposite directions moves the slider panel 18 in opposite directions between its closed and open positions. The illustrated drive rack 26 horizontally and laterally extends from the bottom edge of the slider panel 18. It is noted that the drive rack 26 can alternatively be located in any other suitable location such as, for example, the drive rack 26 can extend from the top edge of the slider panel 18. The drive rack 26 is rigidly secured to of the slider panel 18 so that movement of the drive rack 26 upon rotation of the drive gear 30 moves the slider panel 18 along with the drive rack 26. The drive rack 26 can be secured to the slider panel 18 in any suitable manner. The illustrated drive rack 26 includes a row of laterally spaced-apart and upward-facing teeth 32 sized and shaped to cooperate with the drive gear 30 as described in more detail hereinafter. It is noted, however, that the row of teeth 32 can alternatively have other suitable orientations depending on the orientation and/or location of the drive pinion 30.

The electric drive motor 28 has a rotating output shaft 33 operably connected to the drive gear to rotate the drive gear 30. The illustrated output shaft 33 has a generally horizontal and laterally extending axis of rotation 34 which is substantially parallel to the face of the fixed panel 12. The electric drive motor 28 is suitably connected to vehicle power. The illustrated drive motor 28 has a power cable or wire 36 extending downward through the frame 16 and into the vehicle structure to the vehicle power source. The control circuit and/or the drive motor 28 can include anti-pinch technology if desired. The electric drive motor 28 can be of any suitable type such as a brushed or brushless D.C. motor or the like.

The illustrated drive assembly 20 also includes a gear box or assembly 38 assembly located between the drive motor 28 and the drive gear 30. The illustrated gear box 38 receives the laterally extending motor output shaft 33 and has a generally horizontal and rearwardly extending output shaft 40, substantially perpendicular to the motor output shaft 33. That is, the gear box output shaft 40 has an axis of rotation 42 that is substantially perpendicular to the rotational axis 34 of the drive motor 28. The illustrated motor 28 is secured to the gear box 38 with mechanical fasteners 41 but can alternatively be secured in any other suitable manner. The gear box 38 enables a desired package size and orientation for the drive assembly 20 and preferably increases the torque output and decreases the speed output of the drive motor 28. The drive gear 30 is secured to the gear box output shaft 40 so that the drive gear 30 is selectively rotated about the axis of rotation 42 by the drive motor 28 to move the drive rack 26. Thus, the axis of rotation of the drive gear is horizontal and substantially perpendicular to the face of the fixed panel 12. When the drive motor 28 turns the drive gear 30 in one direction (clockwise as viewed in FIG. 3) the drive gear 30 pushes the drive rack 26 and the slider panel 18 toward its open position and when the drive motor 28 turns the drive gear 30 in the other direction (counter-clockwise as viewed in FIG. 3) the drive gear 30 pulls the drive rack 26 and the slider panel 18 toward its closed position. It is noted that the illustrated drive gear 30 is a spur gear but any other suitable type of gear and rack can be utilized. It is also noted that any other suitable type of drive system can alternatively be utilized such as, for example, cable, screw, "Goldie", "tape", or bead.

The illustrated drive assembly 20 also includes a mounting bracket 44 supporting the drive motor 28, the drive gear 30, and the gear box 38 and securing drive motor 28, the drive gear 30, and the gear box 38 to one of the fixed panels. Thus, the drive motor 28, the drive gear 30, the gear box 38, and the mounting bracket 44 are supported by the fixed panel 12. The illustrated mounting bracket 44 supports secures the components near the bottom right corner of the opening 14 which is the bottom corner opposite the side of the opening 14 in which the slider panel 18 moves its open position. It is noted that the illustrated drive motor 28 is located entirely within the outer periphery of the fixed panel 12. It is also noted that the illustrated the drive motor 28, the drive gear 30, the gear box 38, and the mounting bracket 44 are each located entirely within the outer periphery of the frame 16. The illustrated gear box 40, mounting bracket 44 and fixed panel 12 are each provided with mounting holes 46 which receive mechanical fasteners 48 such as, for example, bolts passing through openings 46 to secure the mounting bracket 44 and the gear box 38 to the stationary or fixed panel 12. Alternatively, the mounting bracket 44 can be secured to the fixed panel 12 in any other suitable manner such as, for example, by adhesive or the like. It is noted that the mounting bracket can alternatively be secured to the frame 16. The drive motor 28 is preferably isolated from the fixed panel 12 in any suitable manner such, for example, using rubber insulators or the like, adhesives or the like, or encapsulating the mounting bracket 44 in RIM, PVC, or other sound/vibration absorbing material.

Figure 5:
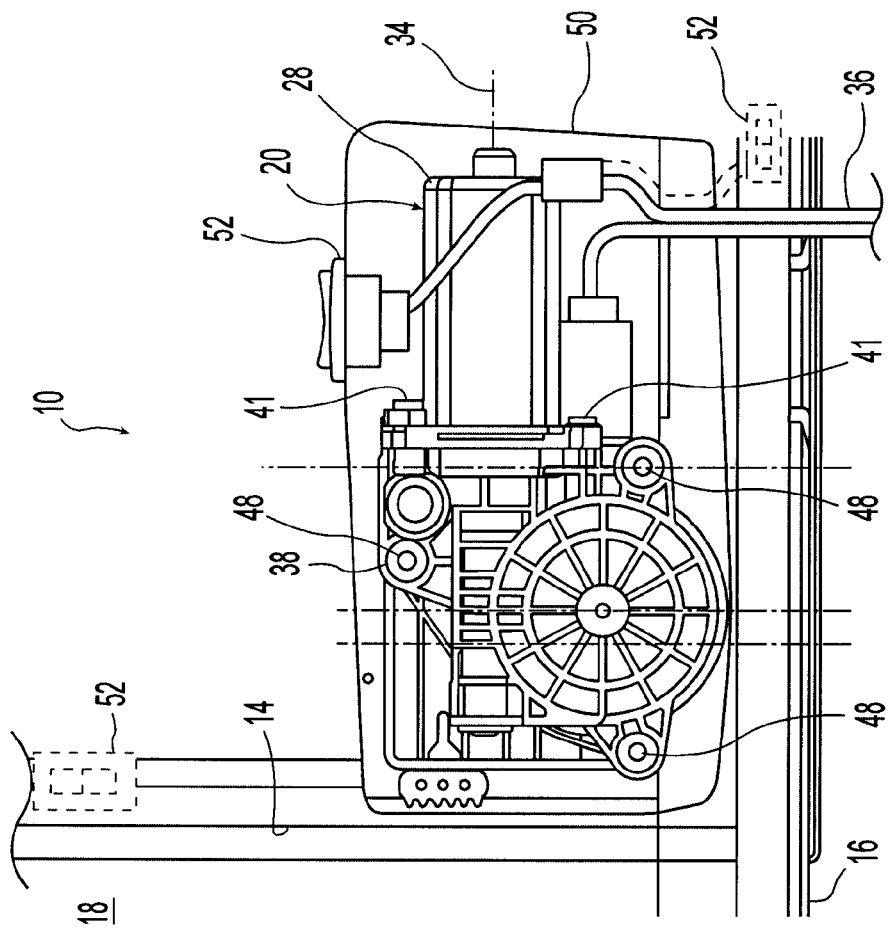
FIG. 5 is a diagrammatic view of the drive assembly of the slider window assembly of FIGS. 1 to 4 showing alternative operating switch locations.

As best shown in FIG. 5, the illustrated slider window assembly includes a drive assembly or motor cover 50 cooperating with the mounting bracket 44 to enclose the drive motor 28, the drive gear 30, and the gear box 38. The illustrated cover 50 is generally box-shaped but any other suitable configuration can alternatively be utilized. The cover 50 is preferably removably attached to the mounting bracket 44 and can be attached thereto in any suitable manner.

The control circuit for the drive motor 28 can include a first or primary manually-operable control switch (not shown) located to be operated by the driver or other front seat passengers and a second or secondary manually-operable control switch 52 secured to and supported by the slider window assembly 10 to be operated by rear seat passengers. The first or primary switch is preferably located at an overhead console or dash board of the motor vehicle. The second or secondary switch 52 is preferably located on the motor cover 50, the slider window frame 16, or the fixed panel 12. The secondary switch 52 can preferably be locked out from operating or disengaged by a lock button located by the driver window switch control panel or other suitable location similar to the way rear controls for rear door windows can be selectively locked or disengaged. It is noted that the locations of the primary and the secondary switches can be reversed if desired so that the primary switch is located on the slider window assembly. It is also noted that the switch 52 located on the slider window assembly 10 can be the only switch if desired such as, for example, aftermarket applications which desire to have simple installation. It is also noted that the switch 52 located on the slider window assembly 10 can be eliminated if desired such as, for example, applications with no rear seats.

Figure 6:
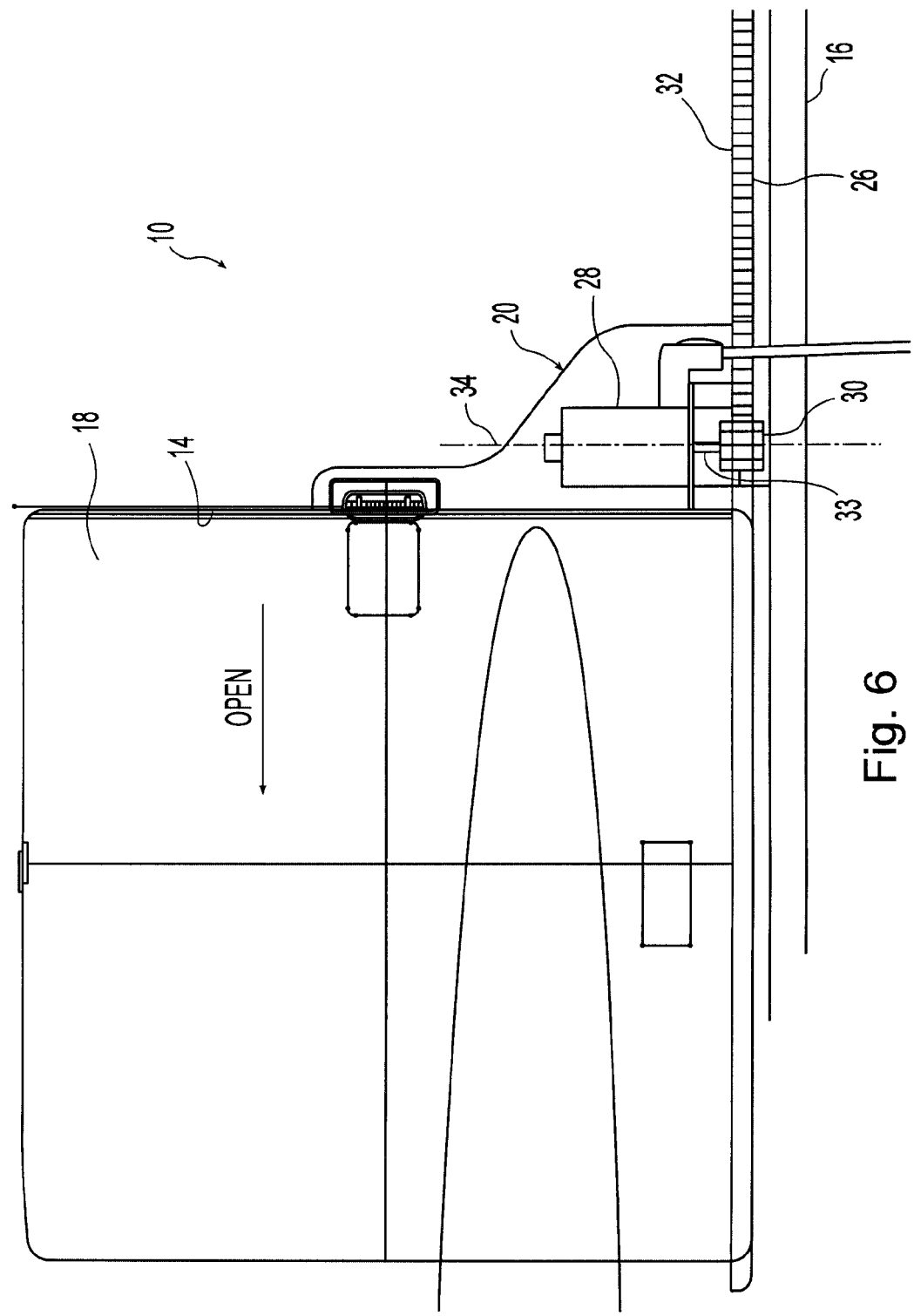
FIG. 6 is a rear elevational view similar to FIG. 3 but showing an alternative embodiment of the drive assembly.

FIG. 6 illustrates an alternative embodiment of the drive assembly 20. This embodiment is substantially similar to the first embodiment describe above except that the drive motor 28 and the drive gear 30 are each oriented different and the gear box 38 is eliminated. The drive motor 28 is oriented so that its output shaft 33, and axis of rotation 34, extends in a vertical direction and is substantially parallel to the face of the fixed panel 12. The drive gear 30 is directly connected to the motor output shaft 33 so that the rotational axis of the drive gear 30 also extends in a vertical direction and is substantially parallel to the face of the fixed panel 12. If additional torque is needed beyond what the output shaft 33 of the drive motor 28 can produce, this embodiment can also utilize a gear box to increase torque output and/or reduce speed output. The drive rack 26 is oriented so that the row of teeth 32 are rearward facing and engaged by the drive gear 30. This embodiment illustrates that the drive assembly 20 can have different configurations within the scope of the present invention.

Figure 7:
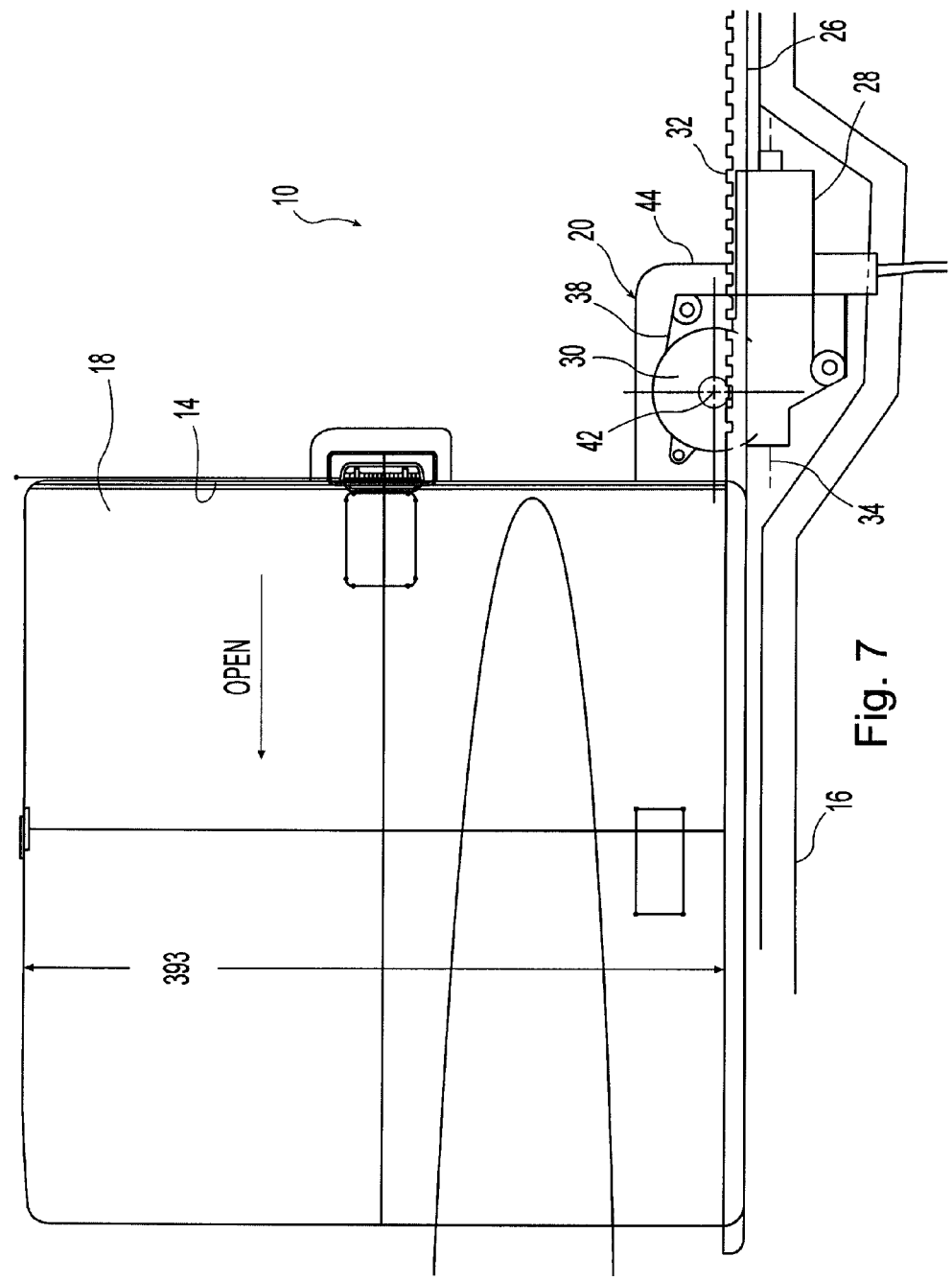
FIG. 7 is a rear elevational view similar to FIGS. 3 and 6 but showing another alternative embodiment of the drive assembly.

FIG. 7 illustrates another alternative embodiment of the drive assembly 20. This embodiment is substantially similar to the first embodiment described above except that the drive motor 28 is located below the drive rack 26 and the fixed panel 12. In this configuration, the drive assembly 20 is less visible through the fixed panel 12. In this embodiment, however, the vehicle structure may need to be adapted to accommodate the position of the drive motor 28. This embodiment further illustrates that the drive assembly 20 can have different configurations within the scope of the present invention.

Figure 8:
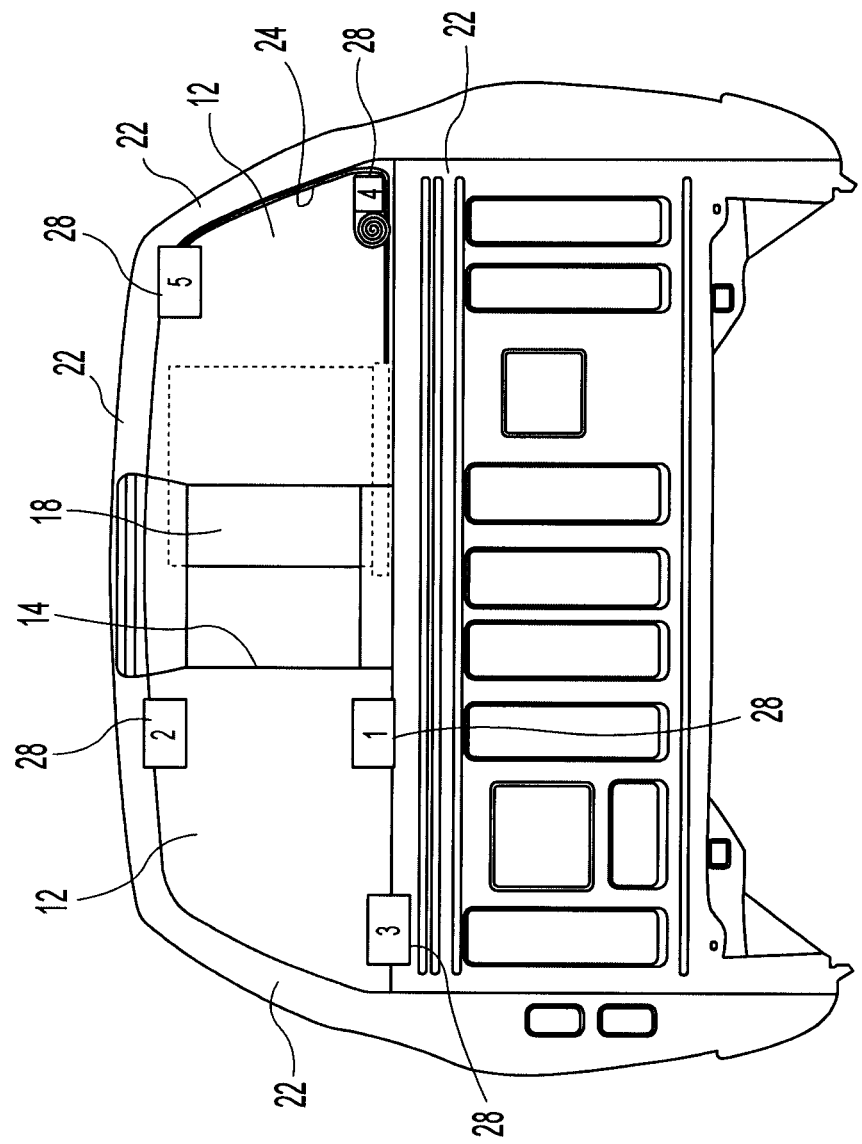
FIG. 8 is diagrammatic view showing and alternative opening direction and alternative attachment locations for the motor of the drive assembly.

FIG. 8 illustrates that the slider panel 18 can alternatively move toward the right or passenger side of the vehicle when moving toward its open position. FIG. 8 also illustrates various alternative mounting locations for the drive motor 28 within the scope of the present invention. As shown, the drive motor 30 can be mounted to the fixed panel 12 (1) adjacent the lower edge of the fixed panel 12 near the opening 14 opposite the direction of movement so that the drive motor 28 pushes the slider panel 18 to its open position, (2) adjacent the upper edge of the fixed panel 12 near the opening 14 opposite the direction of movement so that the drive motor 28 pushes the slider panel 18 to its open position, (3) adjacent the lower edge of the fixed panel 12 near the outer end of the fixed panel 12 opposite the direction of movement so that the drive motor 28 pushes the slider panel 18 to its open position, (4) adjacent the lower edge of the fixed panel 12 near the other outer edge of the fixed panel 12 in the direction of movement so that the drive motor 28 pulls the slider panel 18 to its open position, or (5) adjacent the upper edge of the fixed panel near the other outer edge of the fixed panel 12 in the direction of movement so that the drive motor 28 pulls the slider panel 18 to its open position. It is noted that the drive motor 28 can alternatively be secured to the fixed panels 12 and/or the frame 16 at any other desired location.

From the foregoing disclosure it will be apparent that each of the features of the various disclosed embodiments can be utilized in any combination.

From the foregoing disclosure it will be apparent that the slider window assembly 10 has a direct drive to eliminate the need for cable assemblies, drums etc. It is also apparent that the slider window assembly 10 is easier to install because the drive motor 28 and/or control switch 52 is mounted to the window assembly 10 to form a single one-piece unit so that the drive motor 52 and/or control switch does not need to be separately attached to the vehicle sheet metal structure.

From the foregoing disclosure and detailed description of certain preferred embodiments, it will be apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A motor vehicle comprising, in combination:
   at least one body panel forming a panel opening;
   a slider window assembly positioned within the panel opening to close the panel opening and secured to the at least one body panel;
   wherein the slider window assembly comprises:
   at least one fixed panel located adjacent a window opening;
   a slider panel movable between a closed position wherein the slider panel covers the window opening and an open position wherein the slider panel does not entirely close the window opening; and
   a drive assembly operably connected to the slider panel to selectively move the slider panel between the closed and open positions;
   wherein the drive assembly includes a rack secured to the slider panel and having a row of teeth, an electric motor secured to a fixed position on the slider window assembly, and a gear operably connected to the motor and directly engaging the rack so that operation of the motor in opposite directions moves the slider panel in opposite directions between the closed and open positions;
   wherein the gear rotates about a horizontal axis of rotation substantially perpendicular to a face of the at least one fixed panel, and a gear assembly operably connects the motor to the gear to reduce speed and increase torque;
   wherein a mounting bracket is secured to the at least one fixed panel, the gear assembly is secured to and supported by the mounting bracket, and the electric motor is secured to and supported by the gear assembly so that the mounting bracket, the gear assembly, the gear, and the electric motor are supported by the at least one fixed panel; and wherein the mounting bracket, the electric motor, the gear assembly, and the gear are each located entirely within an outer periphery of the fixed panel and spaced inwardly from the periphery of the fixed panel and the body panel.

2. The motor vehicle according to claim 1, wherein the at least one fixed panel includes two spaced apart fixed panels forming the window opening therebetween.

3. The motor vehicle according to claim 1, further comprising a peripheral frame extending about the at least one fixed panel, and wherein the electric motor is located entirely within an outer periphery of the frame.

4. The motor vehicle according to claim 1, wherein the mounting bracket is secured to the fixed panel with mechanical fasteners extending through mounting openings in the fixed panel.

5. The motor vehicle according to claim 1, further comprising manually-operable control switch secured to the slider window assembly and operably connected to the motor to selectively activate and deactivate the motor.

6. The motor vehicle according to claim 1, further comprising a motor cover enclosing the motor and the gear and a control switch secured to the motor cover and operably connected to the motor to selectively activate and deactivate the motor.

7. The motor vehicle according to claim 1, further comprising a removable motor cover that cooperates with the fixed panel to enclose, the mounting bracket, the gear assembly, the motor and the gear.

8. The motor vehicle according to claim 1, wherein the fixed panel is a glass window.

9. The motor vehicle according to claim 1, wherein the slider panel is a glass window.

10. The motor vehicle according to claim 1, wherein the teeth face in a direction parallel to the face of the fixed panel and inwardly toward a center of the fixed panel.

11. The motor vehicle according to claim 1, wherein the rack is located entirely within an outer periphery of the fixed panel.

12. The motor vehicle according to claim 1, further comprising a first manually-operable control switch operably connected to the motor to selectively activate and deactivate the motor and located on the slider window assembly and a second manually-operable control switch operably connected to the motor to selectively activate and deactivate the motor and located a position remote from the slider window assembly.

13. A motor vehicle comprising, in combination:
at least one body panel forming a panel opening;
a slider window assembly positioned within the panel opening to close the panel opening and secured to the at least one body panel;
wherein the slider window assembly comprises:
at least one fixed panel adjacent a window opening;
a slider panel movable between a closed position wherein the slider panel covers the window opening and an open position wherein the slider panel does not entirely close the window opening; and
a drive assembly operably connected to the slider panel to selectively move the slider panel between the closed and open positions;
wherein the drive assembly includes a rack secured to the slider panel, an electric motor, a gear operably connected to the motor by a gear assembly and operably engaging the rack so that operation of the motor in opposite directions moves the slider panel in opposite directions between the closed and open positions, and a manually-operable control switch secured to the slider window assembly and operably connected to the motor to selectively activate and deactivate the motor; and
wherein a mounting bracket is secured to the at least one fixed panel, the gear assembly is secured to and supported by the mounting bracket, and the electric motor is secured to and supported by the gear assembly so that the mounting bracket, the gear assembly, the gear, and the electric motor are supported by the at least one fixed panel and spaced inwardly from the periphery of the fixed panel and the body panel.

14. The motor vehicle according to claim 13, further comprising a removable motor cover that cooperates with the fixed panel to enclose, the mounting bracket, the gear assembly, the motor and the gear and the control switch is secured to the motor cover.

15. The motor vehicle according to claim 13, further comprising a frame extending about the fixed panel and wherein the control switch is secured to the frame.

16. The motor vehicle according to claim 13, further comprising a second manually-operable control switch operably connected to the motor to selectively activate and deactivate the motor and located a position remote from the slider window assembly.

17. The motor vehicle according to claim 13, wherein the mounting bracket, the gear assembly, the electric motor, the rack, and the gear are each located entirely within an outer periphery of the fixed panel.

\* \* \* \* \*